US010819597B2

United States Patent
Monetti et al.

(10) Patent No.: US 10,819,597 B2
(45) Date of Patent: Oct. 27, 2020

(54) NETWORK DEVICE MEASUREMENTS EMPLOYING WHITE BOXES

(71) Applicant: AT&T Intellectual Property I, L.P., Atlanta, GA (US)

(72) Inventors: Steven A. Monetti, Mountain Lakes, NJ (US); Tzuu-Yi Wang, Newtown, PA (US); Richard Koch, Tinton Falls, NJ (US); Tuan Duong, Eatontown, NJ (US); Yaron Koral, Cherry Hill, NJ (US); Kenneth Duell, Princeton, NJ (US); Kathleen Meier-Hellstern, Cranbury, NJ (US); Simon Tse, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 45 days.

(21) Appl. No.: 16/223,311

(22) Filed: Dec. 18, 2018

(65) Prior Publication Data

US 2020/0195534 A1    Jun. 18, 2020

(51) Int. Cl.
| H04L 12/26 | (2006.01) |
| G06F 9/455 | (2018.01) |
| H04L 29/08 | (2006.01) |
| H04L 12/935 | (2013.01) |
| H04L 12/825 | (2013.01) |
| H04L 12/801 | (2013.01) |

(52) U.S. Cl.
CPC ........ *H04L 43/062* (2013.01); *G06F 9/45558* (2013.01); *H04L 43/065* (2013.01); *H04L 43/067* (2013.01); *H04L 43/0894* (2013.01); *H04L 43/106* (2013.01); *H04L 43/16* (2013.01); *H04L 47/11* (2013.01); *H04L 47/12* (2013.01); *H04L 47/25* (2013.01); *H04L 49/30* (2013.01); *H04L 67/1097* (2013.01); *G06F 2009/45595* (2013.01)

(58) Field of Classification Search
CPC ..... H04L 47/25; H04L 47/12; H04L 67/1097; H04L 49/30; H04L 47/11
See application file for complete search history.

(56) References Cited

U.S. PATENT DOCUMENTS

| 7,376,154 | B2 | 5/2008 | Ilnicki et al. |
| 7,710,885 | B2 | 5/2010 | Ilnicki et al. |
| 8,488,466 | B2 | 7/2013 | Breslin et al. |
| 8,903,994 | B2 | 12/2014 | Kramnik et al. |
| 9,407,643 | B1 | 8/2016 | Bavington |
| 9,483,742 | B1* | 11/2016 | Ahmed ............... H04L 63/1441 |
| 10,038,601 | B1 | 7/2018 | Becker et al. |
| 10,044,603 | B1 | 8/2018 | Singh et al. |
| 2014/0016474 | A1* | 1/2014 | Beheshti-Zavareh ....... H04L 47/11 370/236 |
| 2016/0182194 | A1 | 6/2016 | Chandra et al. |
| 2016/0359872 | A1* | 12/2016 | Yadav ..................... H04L 43/04 |
| 2017/0093648 | A1 | 3/2017 | ElArabawy et al. |
| 2017/0237633 | A1 | 8/2017 | Hegde et al. |
| 2017/0279723 | A1 | 9/2017 | Vedam et al. |
| 2018/0034718 | A1* | 2/2018 | Subramani ............ H04L 43/04 |

(Continued)

*Primary Examiner* — Philip J Chea
*Assistant Examiner* — Mohammed Ahmed
(74) *Attorney, Agent, or Firm* — BakerHostetler

(57) ABSTRACT

A system for network device measurements may use a white box to perform measurements that may help determine the likelihood of network anomalies, such as microbursts.

20 Claims, 8 Drawing Sheets

(56) References Cited

U.S. PATENT DOCUMENTS

| | | | |
|---|---|---|---|
| 2018/0205624 A1* | 7/2018 | Rai | H04L 43/026 |
| 2018/0331963 A1* | 11/2018 | Paul | H04L 47/2483 |
| 2019/0104048 A1* | 4/2019 | Nainar | G06F 11/1076 |
| 2019/0253774 A1* | 8/2019 | Grammel | H04J 14/0212 |
| 2019/0297096 A1* | 9/2019 | Ahmed | H04L 63/1425 |
| 2019/0342217 A1* | 11/2019 | Mazurek | H04L 47/25 |
| 2019/0386913 A1* | 12/2019 | Wei | H04L 45/24 |

* cited by examiner

NETWORK DEVICE MEASUREMENTS EMPLOYING WHITE BOXES

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. With the use of general purpose hardware, the operation and management of service provider networks may be improved. This disclosure is directed to addressing issues in the existing technology.

SUMMARY

Conventional measurements may be considered coarse grained and network service providers may use these conventional measurements to plan with redundant resources, such as network devices and links for network capacity, which may be much larger than actually required. The disclosed subject matter may allow for more accurate network planning, which may in-turn introduce cost reduction in network equipment, among other things.

In an example, an apparatus may include a processor and a memory coupled with the processor that effectuates operations. The operations may include obtaining ingress packets at an ingress tap of a network device; obtaining egress packets at an egress tap of the network device; analyzing the ingress packets to obtain ingress information; analyzing the egress packets to obtain egress information; based on the ingress information or the egress information, determining that a network anomaly has occurred; and based on the determining that the network anomaly has occurred, sending a snapshot of data to an analysis engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
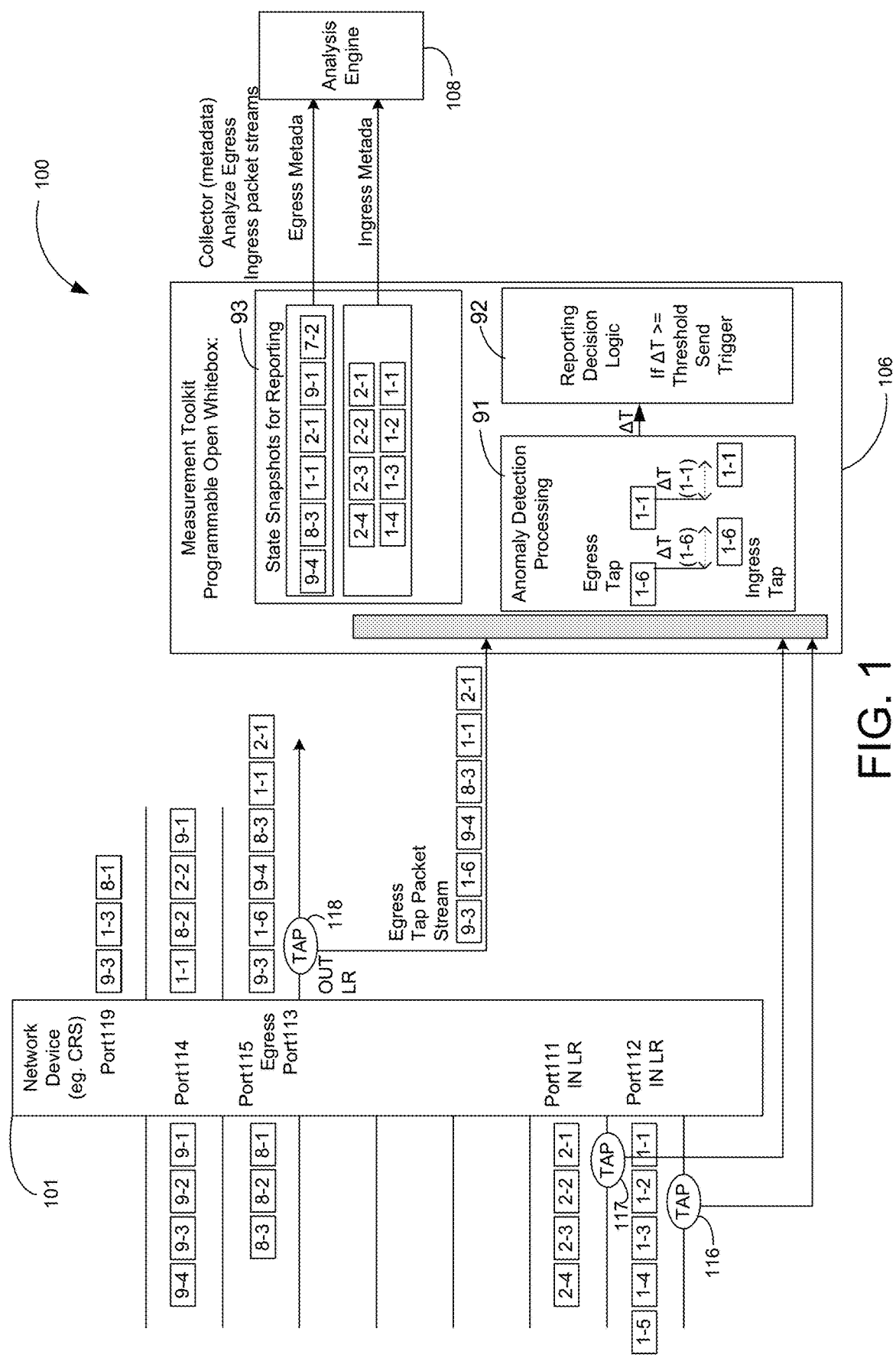
FIG. 1 illustrates an exemplary system for network device measurements.

Network measurements may be used for network planning as well as understanding root causes of network problems. Conventional network measurement equipment may allow coarse grained measurements of a limited set of parameters. For instance, typical network measurements are available on a scale of 5 minutes while the required granularity to detect some network problems is on the scale of milliseconds. Furthermore, there may be inconsistencies with the available measurement data from the routers. For example, within a service provider's network there may be significant inconsistencies between Netflow and simple network management protocol (SNMP) measurements. There may also be inconsistencies within the Netflow data itself.

In addition, conventional measurement equipment may provide only fixed and unchanging measurements. As the network evolves and changes, additional measurements are needed and sought and measurement requirements evolve and change. In this situation, programmable white box network devices (e.g., white box switches, servers, or routers) may be beneficial. Such network devices may provide programmable interfaces that enable more flexibility in terms of what specific measurements may be performed and enable, through software upgrades, the modification of, the introduction of new measurements as the network evolves, and requirements change. Typically network measurements are performed in-line or within the network devices themselves. Such in-line approaches may affect network operations and performance. In addition, if network devices have to be upgraded in-line approaches may cause other significant impacts to operations. Furthermore, conventional measurement techniques may not support the fine-grained measurements used for some Operations and Management (OAM) requirements without significant changes and without significantly affecting network performance The systems disclosed herein may provide for network device measurements that may not degrade the network. The systems may allow for fine-grained measurements that conventional network may not support. Fine-grained measurements may help with network planning and network problem resolution. The network device measurement system disclosed herein introduces to existing networks new measurement capabilities that may be non-intrusive.

Conventional measurements may be considered coarse grained and network service providers may use these conventional measurements to plan with extra redundant resources, such as network devices and links for network capacity, which may be much larger than actually required.

The disclosed subject matter may allow for more accurate network planning, which may in-turn introduce cost reduction in network equipment, among other things. For example, microbursts, which are short-lived traffic surges, may not be measured with conventional techniques. As such, carriers conventionally maintain network capacity that may be much greater than required, although these microbursts are rare. Measuring these microbursts and controlling traffic surges may allow the network capacity to be reduced without reducing the quality of the network. When microbursts occur, deep buffers are needed to limit packet loss. Conventionally, to address network capacity vendor routers have deep buffers, but, as the IP backbone links increase to over 100 Gbps, there may be less of a need for deep buffers. Network devices with deep buffers cost significantly more.

The disclosed system for network device measurements may perform measurements that may help determine the likelihood of microbursts or other network anomalies identify which user applications cause microbursts, and the associated need for deep buffers. It may enable router buffer requirements to be determined and identify a means to intelligently deploy both deep and shallow buffer network devices (e.g., white boxes). The capability to understand temporal (time) and spatial (localized) events may allow for more efficient network capacity planning. For example, it may be determined that without microbursts, the network may use equipment that should support certain size of memory (which is a significant parameter in cost of equipment). Using the disclosed subject matter for example, it may be determined that microbursts occur at only three specific locations, on a certain time of day (say 7 am-9:30 am). With this information, equipment may be assigned that may scale up for this time and place only the capacity (e.g., virtual routers). This affects network planning.

FIG. 1 illustrates an exemplary system for network device measurements. System 100 may include network device 101, measurement device 106, and analysis engine 108. Network device 101, measurement device 106, and analysis engine 108 may be communicatively connected with each other. Network device 101 (e.g., router, server, or switch) may include multiple ingress ports (e.g., port 111, port 112, port 114, or port 115) and egress ports (e.g., port 113 or port 119). Tap 116 and tap 117 may send a copy of ingress packets to measurement device 106 and network device 101. Tap 118 may send a copy of egress packets to measurement device 106 and another network device (not shown). Taps 116, 117, and 118 may be optical taps. A tap (also referred to as network tap) is an external monitoring device that mirrors the traffic that passes between two network nodes. A tap is usually a test access point and is a hardware device inserted at a specific point in the network to monitor data. Analysis engine 108 may receive ingress or egress metadata.

Figure 2:
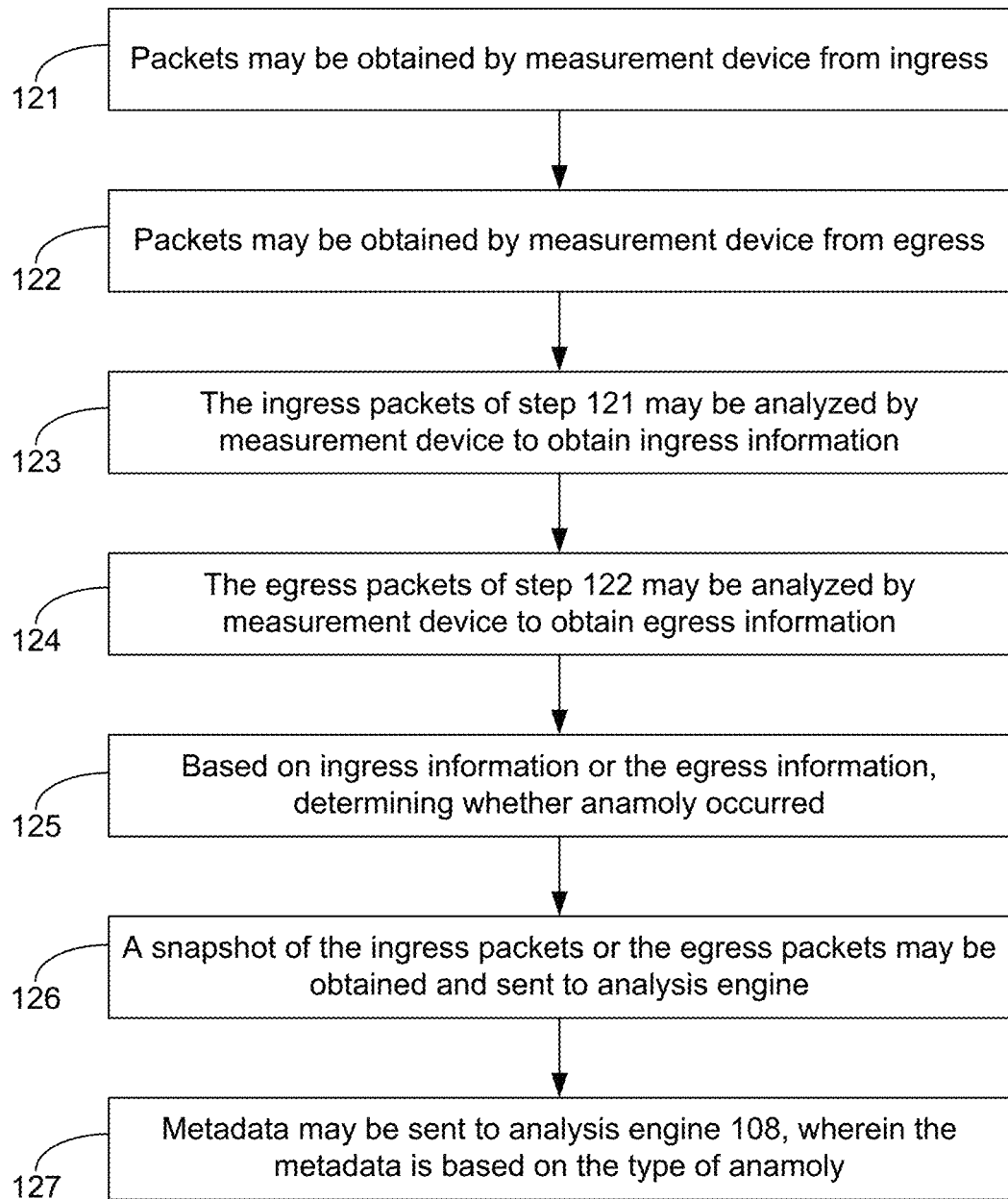
FIG. 2 illustrates an exemplary method for network device measurements.

FIG. 2 illustrates an exemplary method for network device measurements. At step 121, packets may obtained by measurement device 106 from tap 116 or tap 117 of port 112 and port 111, respectively. These packets (e.g., packet 9-4, packet 8-3, packet 2-4, etc.) may carry TCP, UDP, ICMP, MPLS or other protocol, which may be on top of IP. In FIG. 1, tap 116 or tap 117 may be located just before network device 101, but after another device (not shown). At step 122, packets may obtained by measurement device 106 from tap 118 of port 113. In FIG. 2, tap 118 may be located just after network device 101, but before another network device (not shown).

With continued reference to FIG. 2, at step 123, the ingress packets of step 121 may be analyzed by measurement device 106 to obtain ingress information. Ingress information may include payload, ingress router, ingress interface, time stamp, packet size, Experimental (EXP) bit, source internet protocol (IP) address, destination IP address, source port, destination port, protocol number, or instantaneous utilization, among other things. There may be a one to one connection between the ingress\egress physical interface (port) of the network device to the physical interface (port) of the measuring device. The measuring device may have the information in advance of what is the router id and router interface per input interface. An IP packet may include the IP header and the payload, which may have textual or binary content (for example a textual portion of an HTML page). The IP header may include packet size, source and destination IP addresses, source and destination port, protocol number and extra bits. The time stamp may be generated by measurement device 106 when the corresponding packet arrives.

At step 124, the egress packets of step 122 may be analyzed by measurement device 106 to obtain egress information. Egress information may include payload, egress router, egress interface, time stamp, packet size, Experimental (EXP) bit, source internet protocol (IP) address, destination IP address, source port, destination port, protocol number, or instantaneous utilization, interface utilization (e.g., bandwidth utilization), among other things.

With continued reference to FIG. 2, at step 125, based on ingress information or the egress information, determining whether a network anomaly occurred, such as a microburst, and additional descriptive information about the network anomaly. See FIG. 3. Measurement device 106 may detect network anomalies, such as microbursts, by measuring accumulated delay on networking device 101. This delay may be measured by finding the time between a packet that has entered networking device 101 (ingress, such as tap 117 or tap 116) and when it left networking device 101 (egress, such as tap 118). For this purpose, measuring device 101 may correlate between ingress and egress packets. When an ingress and an egress packet are correlated (represent the same original packet) the ingress time stamp may be subtracted from the egress time stamp. This is the delay. A microburst may be determined if there is a significant change in the delay of subsequent packets that lasts for a period. For example, packet 1-1 through packet 1-3 may be measured at 100 microseconds, while packets 1-4 to 1-5 may be measured at 2 ms. In an example, once a microburst is determined, the following may be determined: the source and destination IP address, the ingress and egress networking device interfaces, the amount of packets it contained, or the total duration the delay lasted for the multiple packets, among other things.

Alternatively, at step 126, a snapshot of the ingress packets or the egress packets may be obtained and sent to analysis engine 108, based on the packets of steps 121 or 122 and the information of step 123 or step 124. In some cases, it is enough to know that there has been a microburst, where one knows the actions to take resolve the issue (for example, rate limit the source IP). There may be examples when this microburst is observed but there is not enough information to determine its cause. In this case, for example, it may be preferable to obtain the entire packet information, not only their metadata, and investigate them. This may be the "snapshot" referred to herein. Taking a "snapshot" may be considered a more resource expensive operation, so it may be triggered occasionally based on some parameters or thresholds. An example threshold may be average bytes per millisecond are now 10 times more than normal.

At step 127, metadata may be sent to analysis engine 108, wherein the metadata may be based on one or more of the ingress or egress packets. Following the example of snapshot, some analysis are performed offline for extended analysis. Examining the actual packet contents may be performed offline by analysis engine 108. It may be determined that this microburst is generated by an incorrect configuration of a certain server. Based on this determination, there may be an attempt to configure this certain server so the microburst will not repeat in the future. In another example, an alert may be sent to deploy deep or shallow buffer network devices based on reaching a threshold frequency of a network anomaly, such as detected microbursts. Deploying may include sending configuration changes to network device 101 (which may be one of several network devices between taps) to increase its buffer size.

As mentioned earlier, there are cases where the cause of a certain type of microburst is understood (e.g., a microburst originated from a certain range of IP addresses traffic) and there is an automated action to rate limit such traffic from this range for one minute. A different case may be when the cause of a new type of microburst is not understood well. In this case, analysis 108 may be used by sending a sample or a snapshot of the data to analysis engine 108 for offline processing. This metadata include a copy of the entire packet or alternatively just information about source IP addresses of packets that were on the network device queue\memory \buffer when the microburst was detected. It may be that there were thousands of packets in the queue but only part of them caused the microburst. The snapshot may be sent to analysis engine 108 for offline analysis to determine the cause of this new type of microburst.

Figure 3:
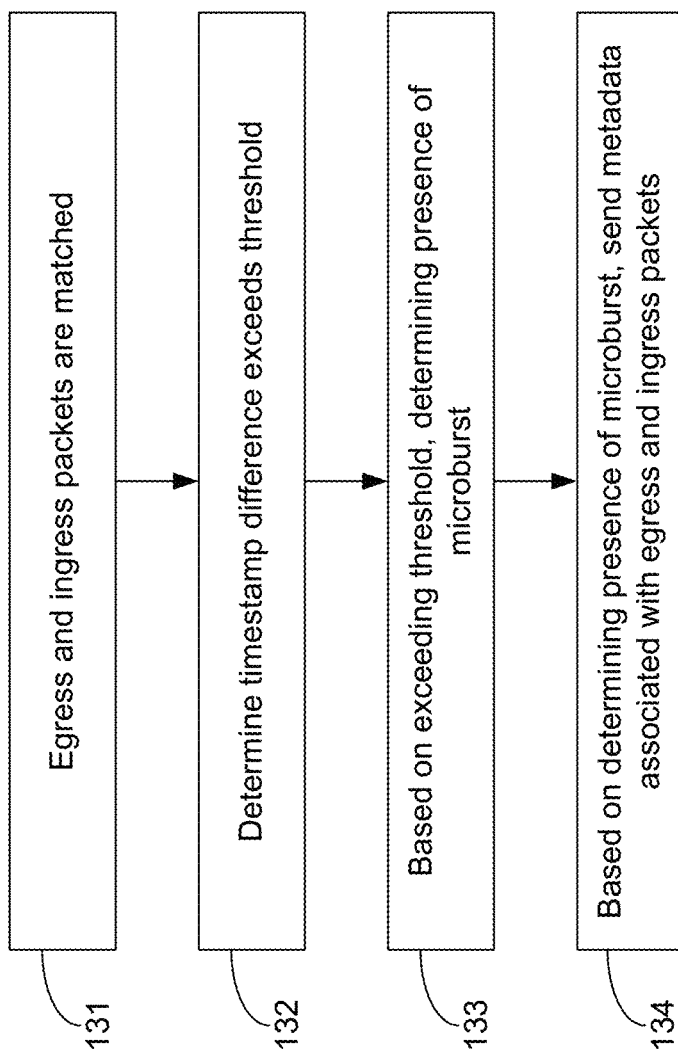
FIG. 3 illustrates an exemplary method for network device measurements.

FIG. 3 illustrates an exemplary method for determining microbursts. At step 131, egress and ingress packets are matched. For example, packet 2-1 on ingress port 111 is matched with packet 2-1 on egress port 113, as shown in FIG. 1. The egress and ingress packets may be matched based on different information. This may vary based on the network setup, but source IP addresses, destination IP addresses, source port numbers, destination port numbers, or (in the case of TCP) TCP sequence number, among other things. In other cases other indicative header fields specific to the protocol may be used. At step 132, by measurement device 106, a timestamp difference of egress and ingress packets (e.g., packet 2-1) is determined to exceed a threshold. There may be a notable difference between cases where there is no delay and cases where networking device 101 is experiencing delay. A threshold may be that the delay is 10 times more than average. The timestamp may be recorded at several different places based on preference. An example may be that the time difference is recorded on the header field of the original packet itself. Another example may be that it is recorded on a message sent to 108. At step 133, based on exceeding the threshold, determining the presence of a microburst. At step 134, based on determining the presence of the microburst, send to analyzer engine 108 a message that includes metadata associated with egress and ingress packets (e.g., packet 2-1).

The new network measurement architecture may be based on programmable white box equipment. The white box measurement equipment may allow much finer grained measurements that are not possible with conventional techniques and the programmability of a white box may enable developers to efficiently implement new network measurements through software upgrades rather than through the purchase of new and independent equipment. Furthermore, network measurements are typically performed through in-line methods, which may affect network operations and performance. The disclosed system for network device measurements provides an architecture that may perform network measurements in a non-intrusive way such that it has minimal effect on network operations and performance. The system supports modular detection capabilities and reporting logic that may pass information (e.g., metadata) to an external collector for further analysis.

The system for network device measurements may allow for the addition of an external programmable white box device to the network to perform fine-grained measurements in a way that is non-intrusive or seamless with respect to the existing network. For example, a set of optical tap devices may be used as a bump-in-the-wire that enables the creation of a duplicate packet stream where the original packet stream is uninterrupted and continues on its original path and the duplicate stream is delivered to the external proposed programmable white box, as shown in FIG. 1. The tap outputs are directed as incoming links for external white box device, as shown in FIG. 1. It is contemplated herein that there may be a case where not all incoming and outgoing ports of the measured router (or other network device) are covered due to lack of available tap devices or efficient use of tap devices by placing them on most likely candidate ports. It is contemplated herein that the architecture may support tapping of incoming ports and outgoing ports of different routers, thus allowing fine-grained measurements of sections of the network rather than a single router. Furthermore, this system for network device measurements can have access to the full packet streams tapped from the original streams and enables the measurement, analysis and processing of each packet, if so desired. It is contemplated herein that the ingress and egress "tap" points can be virtual taps as well as physical taps.

The architecture of the white box device (e.g., measurement device 106) may include multiple modules, such as one or more of the following three modules (also referred herein as elements): (1) Anomaly Detection Processing & Monitoring Element 91; (2) Reporting Logic & Decision Element 92; and (3) State Snapshot for Reporting & History Capture and Distribution Element 93. Anomaly Detection Processing & Monitoring Element 91 may include algorithms that detect anomalous phenomena that are of interest for the network operator. Anomaly Detection Processing & Monitoring Element 91 monitors the packet streams entering the white box (e.g., measurement device 106) and may compute parametric values based on programmed measurement requirements (e.g., counting packets belonging to a certain TCP session and then outputting average session size over the last 10 seconds). For example, such parametric values may count packet streams based on five-tuples, correlate packet streams, or compute time delays (e.g., subtract the ingress timestamp from the egress timestamp). The parametric value computations may be limited by the functional capabilities of the programmable measurement device 106 and may be computed at a level of granularity down to the packet. White box algorithms operating at the packet level may be capable of sub-millisecond granularity. Anomaly Detection & Monitoring Element 91 may collect measurements in real-time. In examples herein, this element may run the logic of correlating between ingress and egress packets and figuring out a delay of each packet that the measured networking device imposes. Other examples could have been collecting real time measurements of a specific protocol or calculating average size of a certain type of packet. Generally, anomalies may be considered detection of errors on an interface or otherwise on a network device and more specifically a threshold amount of errors that may degrade service.

The Reporting Logic & Decision Element 92 may maintain a set of thresholds that represent what anomalous network events require reporting (e.g., identifying a network anomaly based on a threshold, sending an alert based on the threshold, or adjusting behavior of a network device based on the threshold may change to another threshold). In our leading example, the microburst may be an anomalous event. Normally the delay may be less than 100 microseconds, for example, and with a microburst the delay is above one millisecond. Another example of an anomaly would be a single IP that sends packets to over thousands destinations while the normal could be five destinations. This anomaly may indicate an unauthorized network scanning activity. Network scanning may be used for security assessment, system maintenance, and also for performing attacks by hackers. Reporting Logic & Decision Element 92 may include the decision logic for determining what and when stored information in the white box is distributed to a collector and analysis engine. The limitations of the decision element may be bound by the functionality provided by the programmable white box. Reporting Logic & Decision Element 92 may be in charge of maintaining what is considered worth reporting or acting upon. In other words, this element may setup the thresholds. Note that Anomaly Detection Processing & Monitoring Element 91 may only report and may not consider what is high, low, or anomalous. Reporting Logic & Decision Element 92 may manage thresholds over time and location. In an example, for a certain router located at the edge of the network, a microburst may be considered a change of 10 times higher than average traffic rate while in a core router it may be 40 times. It could be that over time the microburst nature changes such that even for the same router the threshold may be updated to be lower or higher.

State Snapshot for Reporting & History Capture and Distribution Element 93 (also herein as State Snapshot Element 93) may maintain an ongoing snapshot of the system's state, e.g. it captures and maintains a running history of metadata of the various packet streams delivered to the measurement device 106. Whenever a report is required, the current state is sent to an external collector for further analysis. A report being required may depend on what is measured. In the example of the microburst, the system may initially be configured to send a report whenever a microburst is detected (or the delay measured by Anomaly Detection Processing & Monitoring Element 91 crosses the threshold determined by Reporting Logic & Decision Element 92). After a certain type of microburst is analyzed and the action to take is determined to deal with it, this type may be excluded from reporting and there may be subsequent reports only on new types of microbursts.

State Snapshot Element 93 (e.g., at step 126) may maintain the required information to analyze a problem (e.g., microburst examples). This information may consist of packet headers and other packet metadata that are in the buffer of the network device (e.g., router) in a given moment, or queue lengths. In the microburst example, the purpose may be to determine the reason for the microburst and the packets that were in the networking device buffers may be gathered when the microburst occurs and analyze the source and destination IP addresses to figure out if the microburst cause can be explained by a specific set of devices (e.g., servers). Port addresses may be needed to determine if the cause was a specific service or type of packets. The payload or content of each packet may not be of initial importance because most likely it would be encrypted and it may not contribute to determining the cause of the microburst. In this case, the packet's payload may be discarded and the report may be compact. State Snapshot Element 93 may provide a suitable representation of the interesting part of the data for reporting. A problem it may addresses is that usually the amount of data relevant to a report is enormous. In an example, reporting all packets of a certain networking device operating at a rate of 100 Gbps may create data that is too large to efficiently store and may double the bandwidth only for the reporting purpose. Therefore, logic may be applied to the data that would compact the data based on at least choosing only the significant data for the issue is of interest for measurement purposes. With regard to microbursts, State Snapshot Element 93 may pick only the packets belonging to the largest sessions at the time of the microburst with one or more other things as disclosed herein for microburst issues. It is contemplated herein that the modules of measurement device 106 and analysis engine 108 may be distributed or combined.

Figure 4:
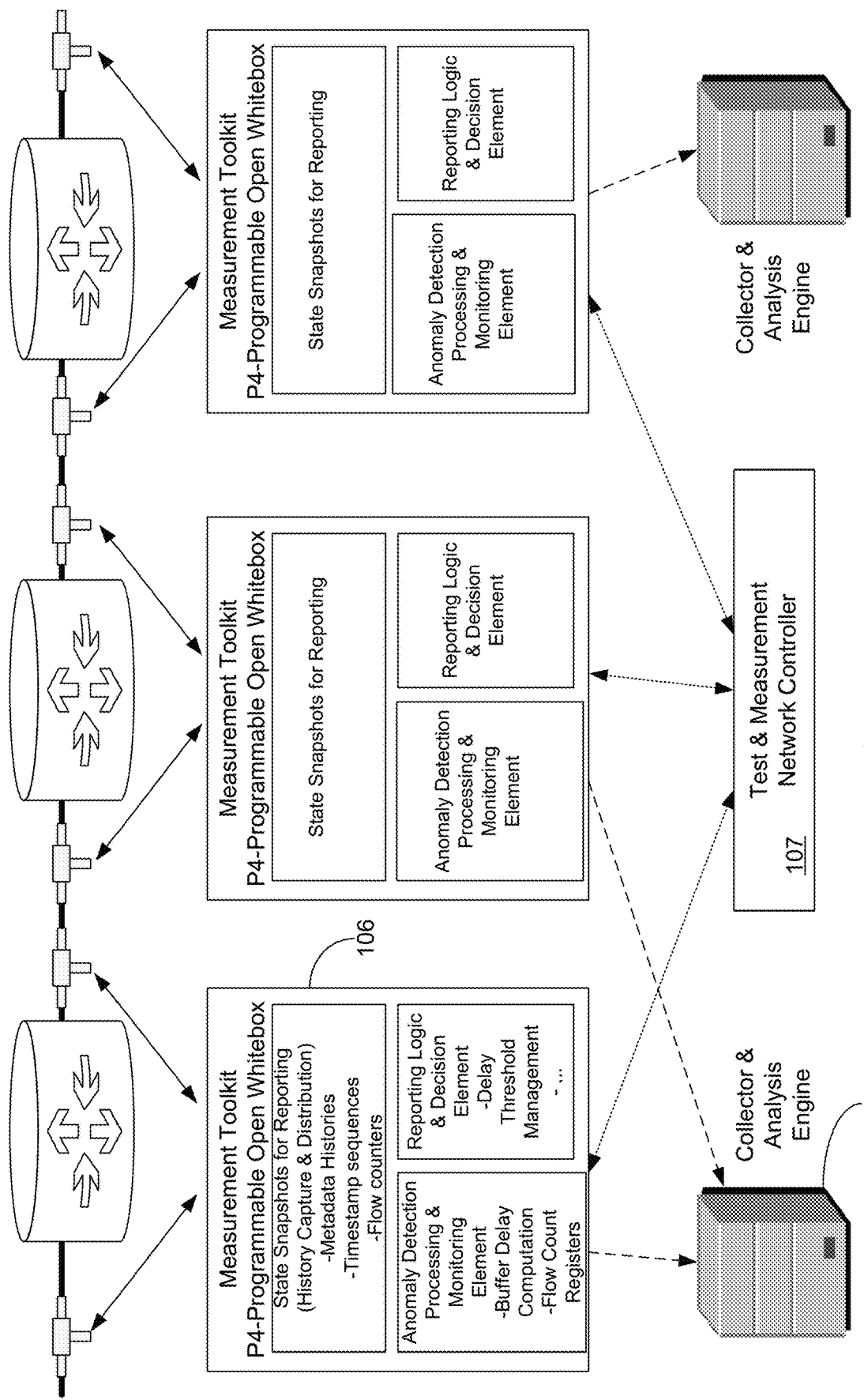
FIG. 4 illustrates an exemplary system for network device measurements that includes a Test and Measurement Network Controller.

With continued reference to State Snapshot Element 93, the captured state information is only limited by the functionality built in the measurement device 106 (e.g., a white box). The system for network device measurements allows for particularly accurate external measurements. Furthermore, while usually adding new measurements introduces problems such as overloading the measured system CPU, the disclosed approach may not significantly affect the measured device (e.g., network device 101). Individual programmable measurement devices 106 (e.g., white boxes) may be distributed throughout the communications network as shown in FIG. 4. FIG. 4 illustrates an exemplary Test & Measurement Network Controller 107 for controlling the individual measurement devices. The controller may dynamically spin up and down individual measurement devices 106, manage measurement software upgrades or specific network tests, or control measurement parameters or thresholds.

Lastly, the individual programmable measurement devices 106 may generate their own packets, which may be used to transmit in-band-telemetry information between measurement devices illustrating the capacity for the test and measurement system to perform both passive and active measurements. Measurement device 106 may be local to a certain geographical location. Sometimes events in one geographical location may explain events in other locations. For example, microbursts experienced in network equipment located in New York City, Atlanta and Boston, all with a common destination terminated at San Francisco, may each generate a packet with the same destination as the microburst destination, such that a measurement device in San Francisco would receive indications of incoming microbursts measured by other remote measurement devices. Another example may be that in order to measure a packet delay between several different networking equipment, an ingress timestamp should be measured at the first networking equipment and egress timestamp of the same packet should be measured at the last. The measurement device may add this telemetry information (e.g., location data) to the packet itself or as an additional packet so the remote measurement device may have this information to calculate the delay. With reference to telemetry information, "each measurement device placed along the path that the packet takes can add the ID of the network equipment it measures. The last measurement device could take the information of the network equipment the packet went through and calculate the delay using information about these network equipment such as their location (if site location is known, it may be used to calculate physical distance).

It is contemplated herein that the disclosed system for network device measurement may be employed in a data center environment that may be characterized by a large degree of redundancy (each packet has many routes to go through between two endpoints).

Network traffic is often measured using the average utilization of a link—5-minute input or output rate, expressed in Mbps or Gbps. The 5-minute averages or even the 1-minute averages are usually smooth—showing the steady state of the network. The actual traffic in a network when viewed at a finer granularity (such as every millisecond) is far burstier. These bursts are so fine, that standard monitoring tools often miss them. Microbursts are these short spikes in network traffic.

Generally, current measurement techniques, e.g. Netflow and SNMP, are based on built-in functions within the routers themselves and are static. Changes to such measurements capabilities may not be a simple matter of a software upgrade to the network equipment.

Figure 5:
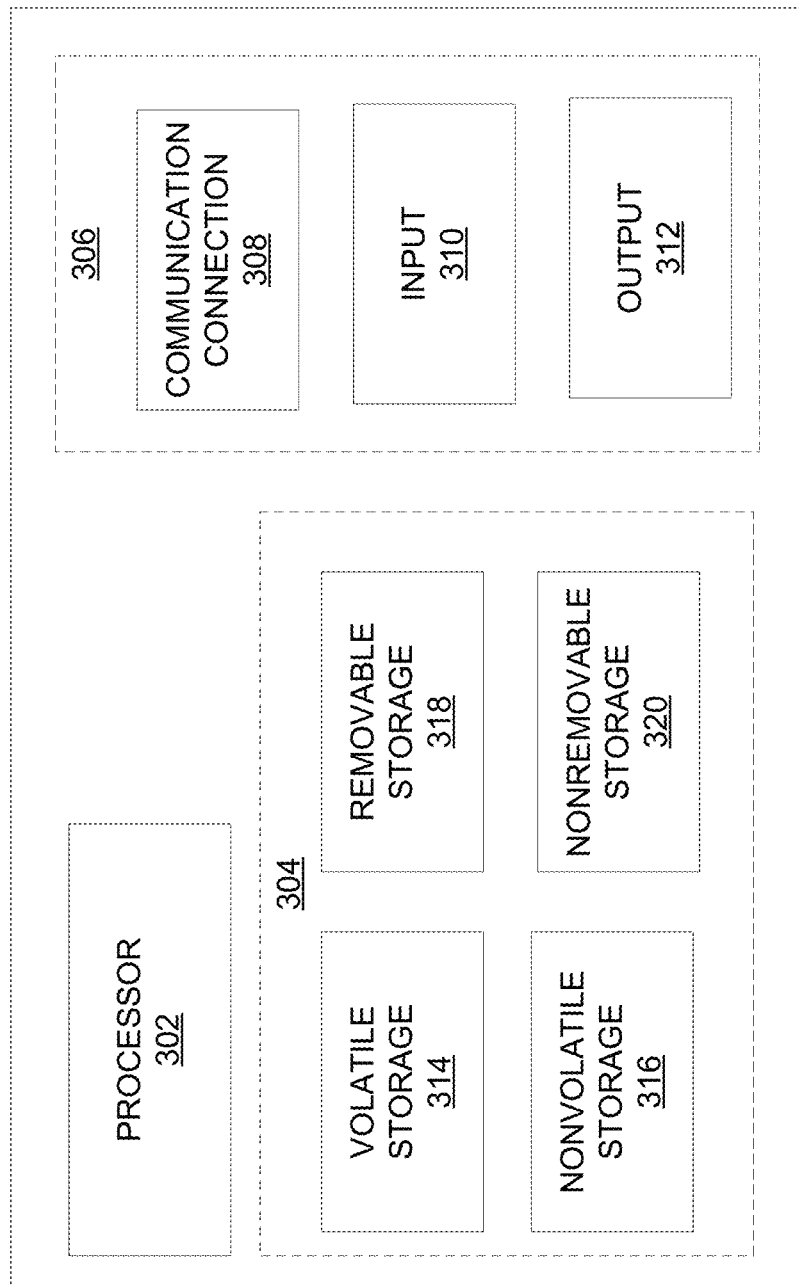
FIG. 5 illustrates a schematic of an exemplary network device.

FIG. 5 is a block diagram of network device 300 that may be connected to or comprise a component of FIG. 1 or FIG. 4 (e.g., analysis engine 108, measurement device 106, etc.). Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
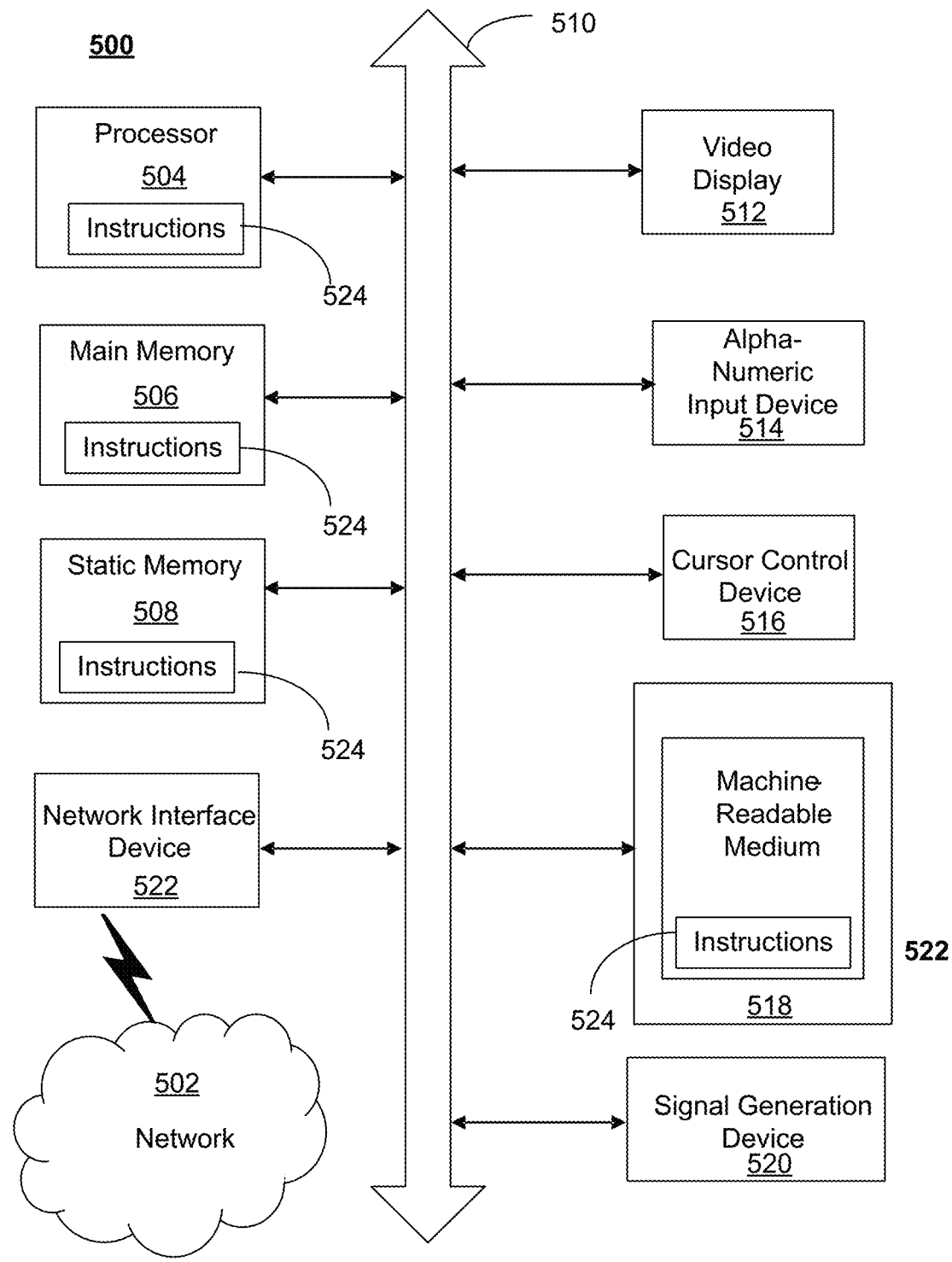
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above for system for network device measurements. One or more instances of the machine can operate, for example, as network device 101, network device 106, analysis engine 108, and other devices of FIG. 1 and FIG. 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7A:
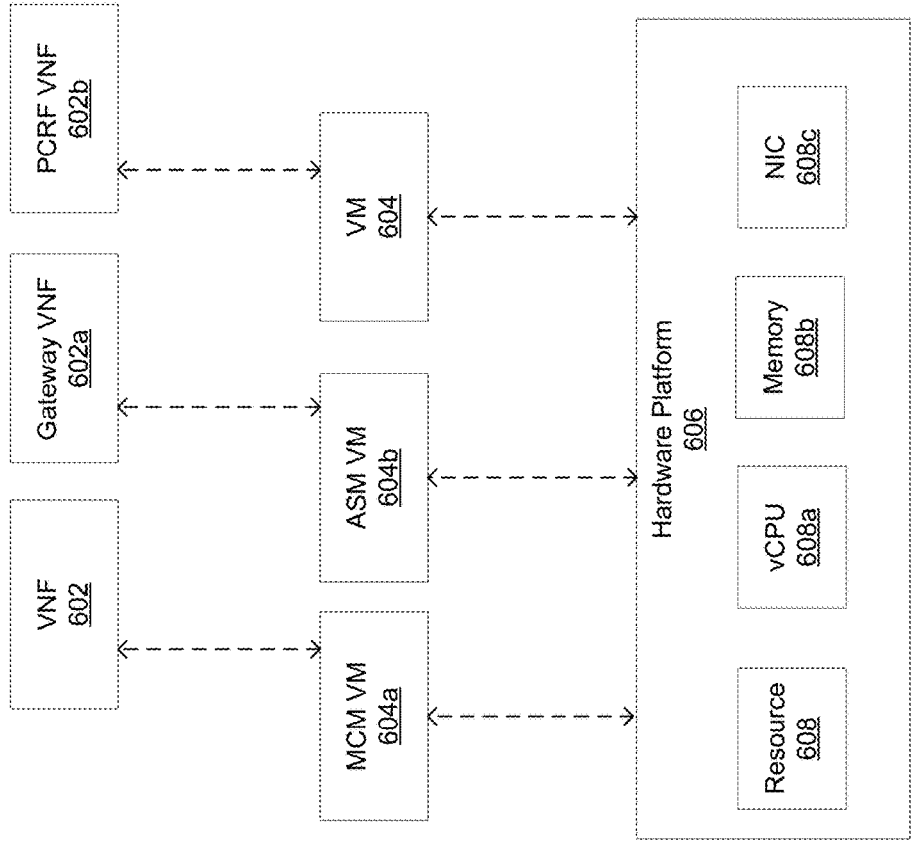
FIG. 7A is a representation of an exemplary network.

FIG. 7a is a representation of an exemplary network 600. Network 600 (e.g., system 100) may be associated with an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 7B:
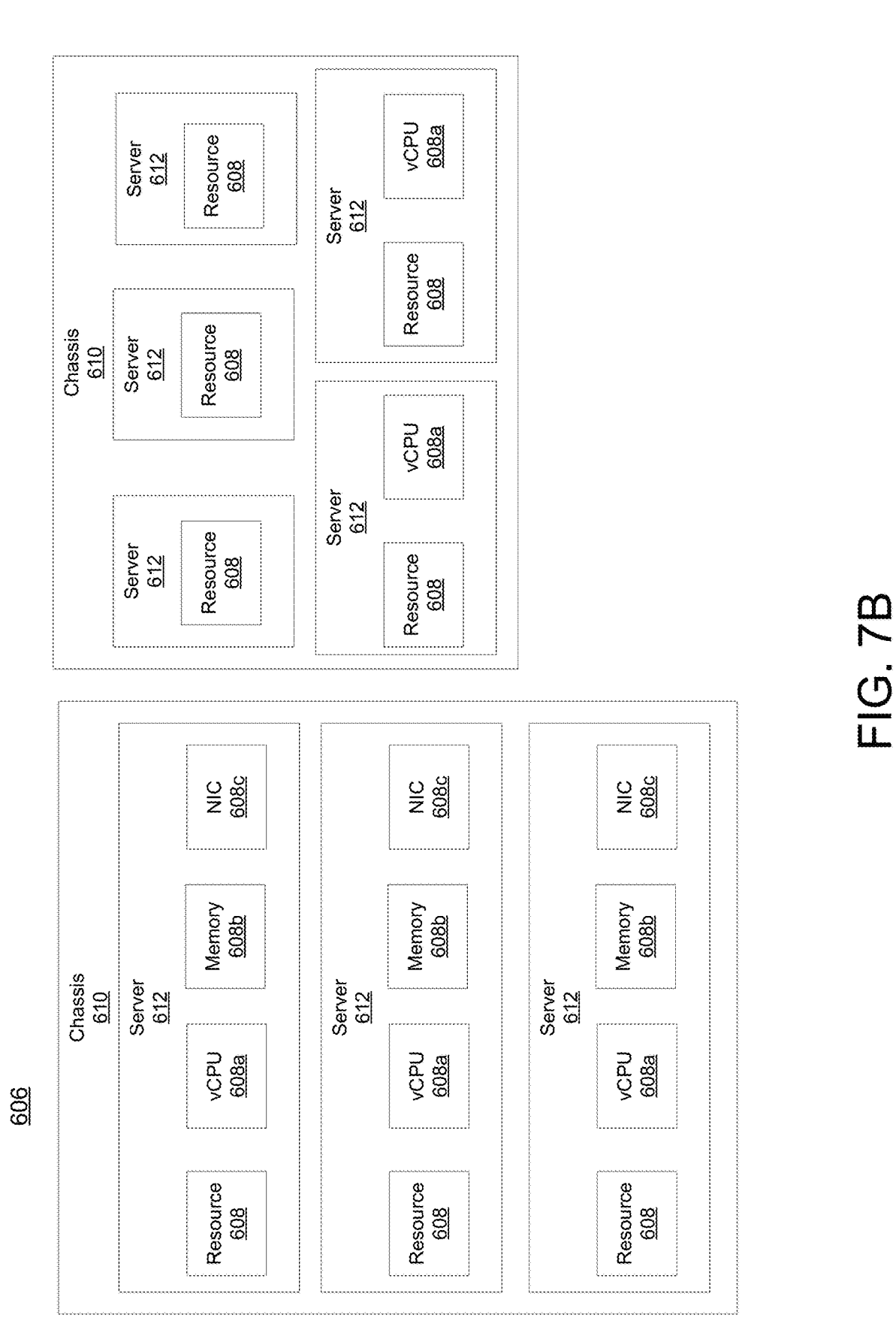
FIG. 7B is a representation of an exemplary hardware platform for a network.

While FIG. 7a illustrates resources 608 as collectively contained in hardware platform 606, the configuration of hardware platform 606 may isolate, for example, certain memory 608c from other memory 608c. FIG. 7b provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 7b illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

With the context of networking and referring to a router, a whitebox may be considered a networking box that is part of the data plane (forwards data packets from one port to another), which is controlled by an external controller that resides on the control plane. White box often refers to the separation of data and control plane which was introduced by SDN (software defined network). This interface between control and data plane, allows the control to configure the white box forwarding table as well as take measurements of a large set of counters in the white box. Using self-described programmable white box, one can implement additional logic, such as in a router white box. In addition to the forwarding table, one can run several programs tailored to specific needs on top of the white box. Conventionally, with non-programmable white boxes, this logic would reside on the control plane. The control plane would host programmable logic and would compile it to forwarding tables on the white box. The problem is that the control plane is considered very slow as compared to data plane. Furthermore, the control plane may see only a small portion of the data, as it is not usually designed to process large amounts of data. Scenarios that require seeing all the data are usually handled on the data plane. Example for such scenario is to find the top K IP addresses with the largest volume of traffic. All traffic should be observed; hence, the processing is usually handled on the data plane. On the other hand, a core router usually does not maintain a huge table that tracks the traffic from all possible IP addresses. To address this a program may be implemented on the programmable white box (e.g., using the data plane) that tracks only the intense users.

Other properties of a programmable white box may be the following: 1) programmable memory—let the programmer define arbitrary variables and data structures; 2) programmable network protocols—let the programmer define any type of protocol (fields); 3) arithmetic operations—available operations support basic arithmetic operations as well as hash function; 4) ability to write data into packets—modify packets as well as adding in-network telemetries (INT) on top of packets; or 5) ability to generate packets. Programmable white boxes allow the programmer adapt and implement according to the specific network (i.e. ISPs provider network) and not be limited to a predefined set of functionalities. Telemetry data may include one or more of the following information associated with a telecommunications network: specific network metrics, time synchronization, local device traffic statistics, system status information, Syslog, SNMP, ACL Logging, accounting, archive configuration change logger, packet capture, interface type, status, speed and duplex, encapsulation, errors on the interface, the last time a network device interface bounced, last time the network device or interface error counters reset, utilization of the network device components (e.g., CPU, interface bandwidth), IP addresses configured on a network device, subnet mask, and MAC address configured on the network device, GPS location of a network device, or facility location of a network device, among other things. The aforementioned may apply to a network device or interface unless otherwise specified.

Contrary to the white box, a black box (e.g., a router by a legacy vendor) usually builds its own forwarding tables and exports a significant amount of predefined measurements. It is usually difficult to modify the routing scheme (for instance to implement LB or specific policy).

While examples of a telecommunications system in which network device measurement messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—system for network device measurements—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method comprising:
   obtaining, by a measurement device, ingress packets at an ingress tap of a network device;
   obtaining, by the measurement device, egress packets at an egress tap of the network device;
   analyzing, by the measurement device, the ingress packets to obtain ingress information;
   analyzing, by the measurement device, the egress packets to obtain egress information;

based on the ingress information or the egress information, determining, by the measurement device, respective egress packets that match respective ingress packets;

determining, by the measurement device, during a period a threshold change in delay between the respective egress packets that match the respective ingress packets;

based on the threshold change in delay between the respective egress packets that match the respective ingress packets, determining, by the measurement device, that a microburst network anomaly occurred; and based on the determining that the microburst network anomaly occurred, sending, by the measurement device, an indication to take an action to prevent subsequent microburst network anomalies from occurring.

2. The method of claim 1, wherein the measurement device is a white box device.

3. The method of claim 1, wherein the action to prevent subsequent microburst network anomalies from occurring comprises rate limiting based on a source IP.

4. The method of claim 1, wherein the egress information comprises time stamp of the egress packets or interface utilization.

5. The method of claim 1, further comprising based on the egress information, adjusting, by the measurement device, a first threshold associated with identifying the microburst network anomaly to a second threshold associated with identifying the microburst network anomaly.

6. The method of claim 1, wherein the determining the microburst network anomaly has occurred is further based on telemetry information of the ingress packets.

7. The method of claim 1, wherein the microburst network anomaly occurring is further based on unauthorized network scanning.

8. A device comprising:
a processor; and
a memory coupled with the processor, the memory storing executable instructions that when executed by the processor cause the processor to effectuate operations comprising:
obtaining ingress packets at an ingress tap of a network device;
obtaining egress packets at an egress tap of the network device;
analyzing the ingress packets to obtain ingress information;
analyzing the egress packets to obtain egress information;
based on the ingress information or the egress information, determining respective egress packets that match respective ingress packets;
determining during a period a threshold change in delay between the respective egress packets that match the respective ingress packets;
based on the threshold change in delay between the respective egress packets that match the respective ingress packets, determining that a microburst network anomaly occurred; and
based on the determining that the microburst network anomaly occurred, sending an indication to take an action to prevent subsequent microburst network anomalies from occurring.

9. The device of claim 8, wherein the device is a white box device.

10. The device of claim 8, wherein the action to prevent subsequent microburst network anomalies from occurring comprises rate limiting based on a source IP.

11. The device of claim 8, wherein the egress information comprises time stamp of the egress packets or interface utilization.

12. The device of claim 8, the operations further comprising based on the egress information, adjusting a first threshold associated with identifying the microburst network anomaly to a second threshold associated with identifying the microburst network anomaly.

13. The device of claim 8, wherein the determining the microburst network anomaly has occurred is further based on telemetry information of the ingress packets.

14. The device of claim 8, wherein the microburst network anomaly occurring is further based on unauthorized network scanning.

15. A computer readable storage medium storing computer executable instructions that when executed by a computing device cause said computing device to effectuate operations comprising:
obtaining ingress packets at an ingress tap of a network device;
obtaining egress packets at an egress tap of the network device;
analyzing the ingress packets to obtain ingress information;
analyzing the egress packets to obtain egress information;
based on the ingress information or the egress information, determining respective egress packets that match respective ingress packets;
determining during a period a threshold change in delay between the respective egress packets that match the respective ingress packets;
based on the threshold change in delay between the respective egress packets that match the respective ingress packets, determining that a microburst network anomaly occurred; and
based on the determining that the microburst network anomaly has occurred, sending an indication to take an action to prevent subsequent microburst network anomalies from occurring a snapshot of data to an analysis engine.

16. The computer-readable storage medium of claim 15, wherein the microburst network anomaly occurring is further based on unauthorized network scanning.

17. The computer-readable storage medium of claim 15, wherein the action to prevent subsequent microburst network anomalies from occurring comprises rate limiting based on a source IP.

18. The computer-readable storage medium of claim 15, wherein the egress information comprises time stamp of the egress packets or interface utilization.

19. The computer-readable storage medium of claim 15, the operations further comprising based on the egress information, adjusting a first threshold associated with identifying the microburst network anomaly to a second threshold associated with identifying the microburst network anomaly.

20. The computer-readable storage medium of claim 15, wherein the determining the microburst network anomaly has occurred is further based on telemetry information of the ingress packets.

* * * * *